United States Patent
Rucker

(10) Patent No.: US 6,634,318 B1
(45) Date of Patent: Oct. 21, 2003

(54) CLOSURE FOR PET FEEDING TOY

(76) Inventor: David Nathan Rucker, 2636 Alcatraz Ave., Berkeley, CA (US) 94705

( * ) Notice: Subject to any disclaimer, the term of this patent is extended or adjusted under 35 U.S.C. 154(b) by 0 days.

(21) Appl. No.: 09/900,232

(22) Filed: Jul. 5, 2001

Related U.S. Application Data

(60) Provisional application No. 60/227,656, filed on Aug. 25, 2000.

(51) Int. Cl.7 .............................................. A01K 29/00
(52) U.S. Cl. ..................................................... 119/709
(58) Field of Search .............................. 119/709, 710, 119/707; 222/541.1, 541.6

(56) References Cited

U.S. PATENT DOCUMENTS

| | | | | |
|---|---|---|---|---|
| 5,947,061 A | * | 9/1999 | Markham et al. | 119/710 |
| 6,073,588 A | * | 6/2000 | McClung et al. | 119/709 |
| 6,129,053 A | * | 10/2000 | Markham et al. | 119/710 |
| 6,186,096 B1 | * | 2/2001 | Miller | 119/709 |
| 6,439,166 B1 | * | 8/2002 | Markham | 119/710 |
| 6,470,830 B2 | * | 10/2002 | Mann | 119/709 |
| 6,484,671 B2 | * | 11/2002 | Herrenbruck | 119/707 |

OTHER PUBLICATIONS

Website printout of "Fluffy Puppy Cone", www.petcelebrations.com.*

Kong Company, Recipe for the Perfect Dog, Year2000, Golden Colorado, USA.

* cited by examiner

*Primary Examiner*—Charles T. Jordan
*Assistant Examiner*—Kimberly S. Smith

(57) ABSTRACT

A closure (400) for a hollow pet toy that holds edible materials contains a cut-out relief (410) that extends above a desired shear plane (170). When fully inserted into the large opening (110) of a pet toy (100) the top (420) of the cut-out relief lies above the shear plane, outside the toy. If the pet bites into the closure or wets it with saliva, it will break or disintegrate into sections (510, 610, 620) which are too small or too large to lodge in the large opening of the toy. Thus when the pet bites or wets and breaks the closure, none of the pieces of the closure can lodge in the opening of the toy and prevent the pet from reaching and eating the contents. An alternative embodiment is provided with a cylindrical top (710) which can be eaten by the pet, cannot lodge in the pet toy opening, and which can be printed or embossed with a logo.

7 Claims, 3 Drawing Sheets

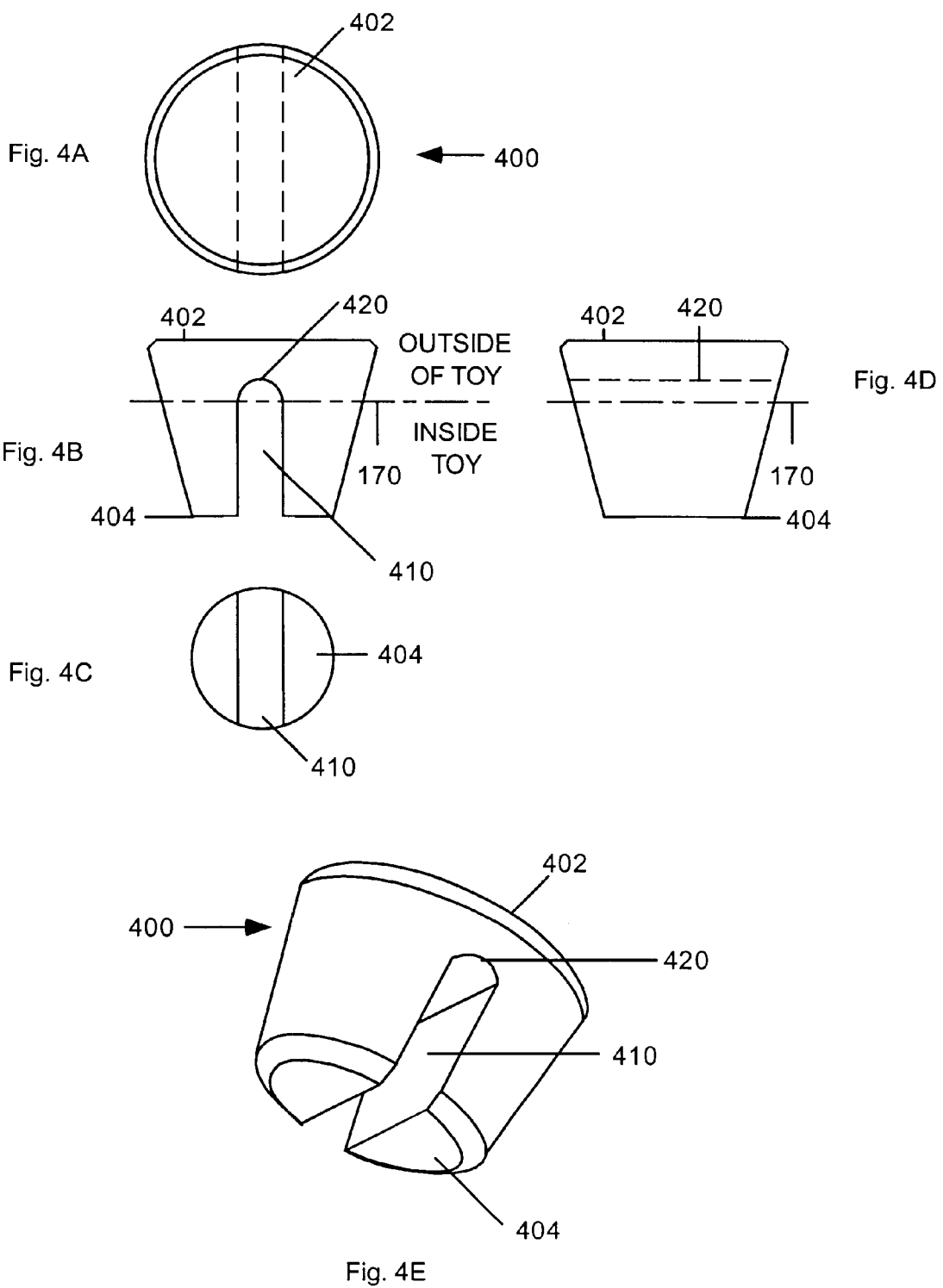

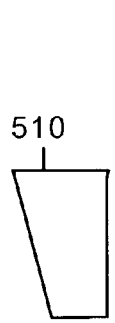
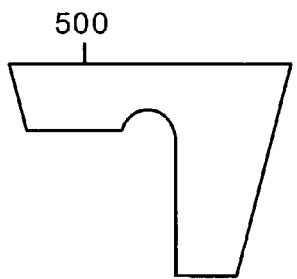
Fig. 5A  Fig. 5B
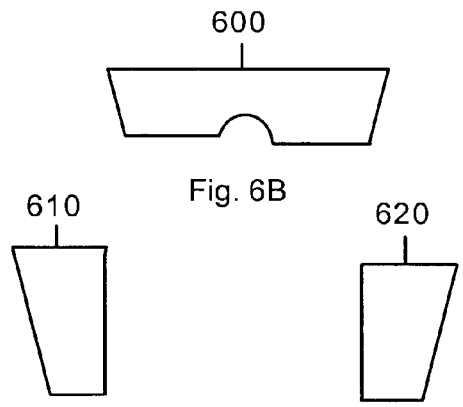
Fig. 6A  Fig. 6B  Fig. 6C
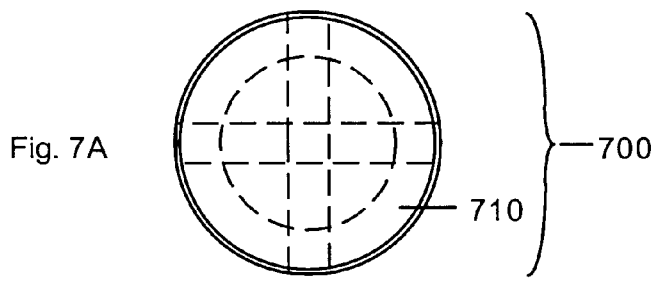
Fig. 7A
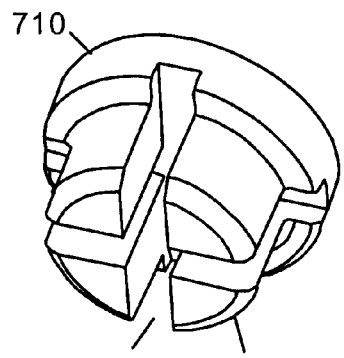
Fig. 7D
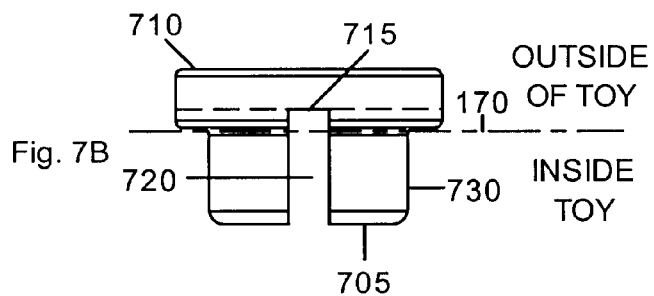
Fig. 7B
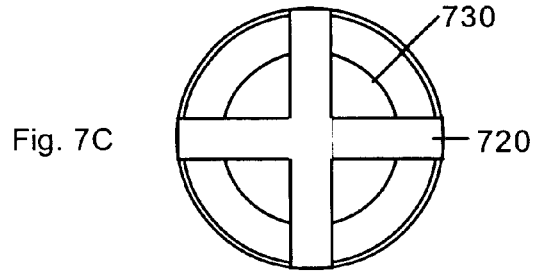
Fig. 7C
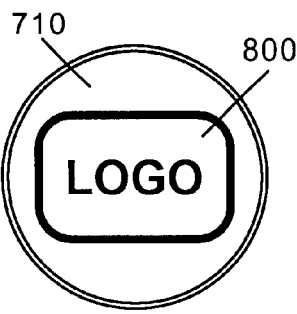
Fig. 8

CLOSURE FOR PET FEEDING TOY

CROSS REFERENCE TO RELATED APPLICATION

This application is entitled to the benefit of Provisional Patent Application Ser. No. 60/227,656 filed Aug. 25, 2000.

FEDERALLY SPONSORED RESEARCH

NONE

Sequence Listing

NONE

BACKGROUND

Field of Invention

This invention relates to pet toys that are designed to contain food, and in particular to the closure which seals the food in the toy.

BACKGROUND

Prior Art—FIG. 1

When left alone, animals frequently become discontented and bored. This is cruel to the animals and leads to behavior problems such as barking, digging, and destructive activities on the part of canines and different problems with other animals. To alleviate this problem, Hamilton, in U.S. Pat. Ser. No. 5,894,815 (1999) has provided an apparatus which presents challenges to animals when they are fed, for example, by burying their food in brushes, dipsticks, and the like. This apparatus is feasible and useful, but is not especially suitable for canines. Training can help alleviate this problem in canines, but it is generally inadequate in the long term.

Another approach to the problem is to provide the dog with an activity that is fun, rewarding, and long-lasting. This is the purpose of toys sold under the trademarks Kong by Kong, Inc. of Golden, Colo., USA, and Rhino by Nylabone, a division of T.F.H. Publications of Neptune City, N.J., USA. Such a toy is also shown in U.S. Pat. Nos. 5,947,061 (1999) and 6,129,053 (2000) to Markham et al. This toy has various recesses in its outer surface, as well as a hollow interior. Food treats are deposited in the recesses and interior. Various levels of difficulty in removing the treats are achieved, depending upon the location, density, solubility, adhesion, and so forth, of the food treats and the shape of toy.

A cross-sectional view of one embodiment of the Kong toy is shown in FIG. 1. The body of toy 100 is made of a rugged, semi-elastic material such as rubber. It is hollow with a first hole 105 at one end (bottom end in drawing) and a second hole 110 at the other end (top end in drawing). The hardness of the rubber comprising toy 100 is about 100 durometer units. A dog's bite can slightly deform toy 100, but not flatten it. Toy 100 is available in various sizes suitable for dogs of different sizes. A typical size is 14 cm long and 8 cm in diameter, at the widest point. The wall thickness is typically 1.5 cm. The diameter of hole 105 at the bottom of toy 100 is typically 1 cm, while the diameter of hole 110 at the top is typically 3.2 cm.

Food 130 of various kinds is stuffed into cavity 140 of toy 100. Food 130 can be dry or wet dog food, fruits, cheese, meat, eggs, peanut butter, and the like. It can be hot, cold, or frozen.

A "tantalizer" food piece 150 (shaped like a medicine capsule) may be placed in hole 105 to attract the dog. Hole 105 is generally too small to permit entry of the dog's tongue or dispensing of any contents.

Hole 110 is the primary entrance and exit for food 130. An "appetizer" tidbit 160 (shaped like a bone) projects from hole 110 to entice the dog to begin eating the contents of toy 100.

While the above prior-art design is useful when toy 100 is filled and then carefully handed to a dog, it suffers from several deficiencies. If appetizer tidbit 160 does not completely occlude hole 110, food 130 can spill out, especially if one or more components are liquid or semi-liquid. If toy 100 is thrown some distance, appetizer 160 can dislodge and food 130 can spill out and be lost as toy 100 flies and lands. When chewed by the dog, appetizer 160 is likely to be sheared at plane 170 at the entrance to hole 110. After being sheared, the remainder of appetizer 160 can adhere to food 130 inside toy 100 and prevent the dog from reaching food 130. The dog can also force the wide end of appetizer 160 into orifice 110, thereby occluding it and preventing the dog from reaching food 130.

Various inedible closures, such as bottle corks and jar lids, have been used throughout history to seal containers. None has been used as a closure for a food-filled pet toy, and there would be no advantage in doing so. If an inedible closure were extracted in whole or in part, it may be swallowed by the animal and cause choking or digestive distress. Inedible closures made of hard materials, such as metal, ceramic or plastic would likely damage a dog's teeth when extracted. Inedible closures made of soft materials, such as cork or soft wood, would likely fragment under a dog's bite and increase the likelihood that the dog would swallow the inedible material in the act of extraction.

BACKGROUND

Objects and Advantages

Accordingly, several objects and advantages of the invention are to provide an improved amusing and challenging pet toy, to provide such a toy especially suitable for canines, which has a hole and a closure which cannot be sheared and fall inside the toy or get stuck in the opening. Other objects are to provide an improved plug for such a toy, to provide an edible plug which seals the large orifice in the toy, prevents spillage of the contents, is not apt to fall out prematurely, is readily dislodged by the dog, will not injure the dog when chewed or swallowed, and which will not block the orifice if sheared or fractured. The result is a closure that is effective, yet can be dislodged by the dog at the proper time.

Further objects and advantages will become apparent from a consideration of the ensuing description and the accompanying drawings.

SUMMARY

In accordance with the invention, an edible seal plug is provided which is a conic or cylindrical section with radial cuts. It securely closes the entrance to the toy, preventing spillage of its contents. In addition, the novel seal plug's construction is such it does not block the main orifice in the toy when it is sheared or fractured at the toy's entrance.

DRAWINGS

Figures

FIGS. 4A through 4E show top, side, bottom, alternate side, and perspective views, respectively, of the intact preferred embodiment of a closure of the present invention.

FIGS. 5A and 5B show two pieces of the closure after shearing.

Figure 1:
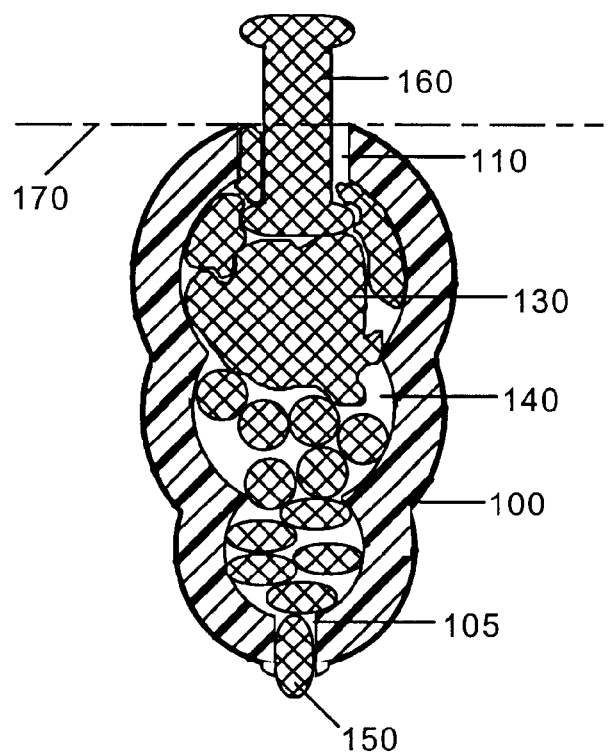
FIG. 1 is a cross-sectional view of a prior-art toy with open ends stuffed with food.

FIGS. 6A, 6B, ad 6C show three pieces of the closure after shearing.

FIGS. 7A through 7D are top, side, bottom, and perspective views, respectively, of an intact alternate embodiment of the closure showing multiple sections that lie inside the toy, beneath the shear plane.

FIG. 8 is a top view of the alternate embodiment of the closure showing an embossed logo.

DRAWINGS

Reference Numerals
100 Toy
105 Hole
110 Hole
130 Food
140 Cavity
150 Tantalizer
160 Appetizer
170 Plane
200 Closure
210 Part of closure
220 Part of closure
400 Closure
402 Top of closure
404 Bottom of closure
410 Cut-out relief
420 Top of cut-out relief
500 Part of sheared closure
510 Part of sheared closure
600 Part of sheared closure
610 Part of sheared closure
700 Closure
705 Bottom of closure
710 Top of closure
715 Location
720 cut-out relief
730 section
800 Logo

DETAILED DESCRIPTION

Preferred Embodiment

Figure 2:
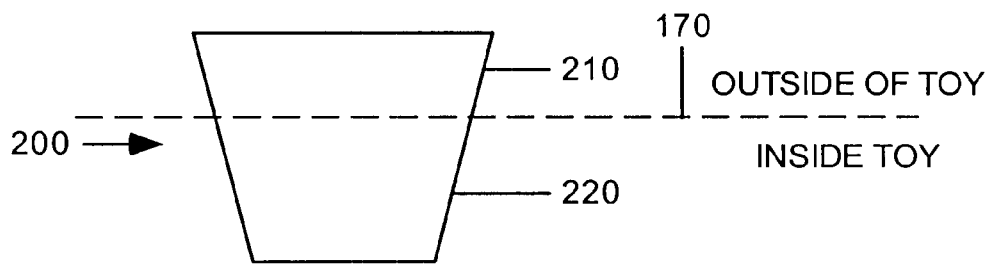
FIG. 2 is a cross-sectional view of an inventive closure for the toy of FIG. 1 prior to shearing.
Figure 3:
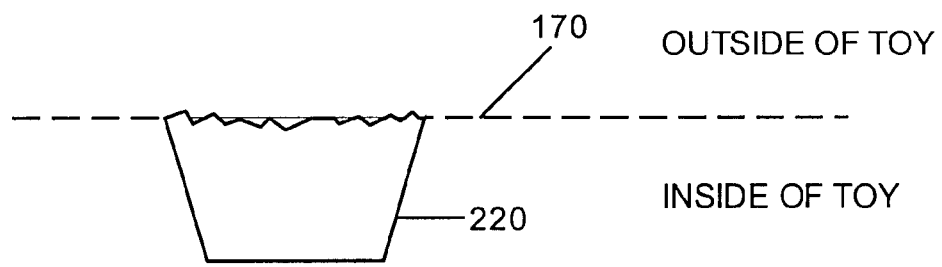
FIG. 3 is a cross-sectional view of the closure of FIG. 2 after shearing.

Edible Closure—FIGS. 1, 2 and 3

FIG. 2 shows a closure 200 that effectively seals entrance 110 of toy 100 (FIG. 1). closure 200 comprises an edible truncated conic section. Closure 200 is made of compressed, edible material such as dry dog food. When closure 200 is inserted in hole 100, a portion 210 of closure 200 resides outside of toy 100, below plane 170. In use, closure 200 is inserted into hole 110 of toy 100 so that portion 220 resides inside toy 100. When closure 200 is later chewed by a dog (not shown), it will likely be extracted in whole and consumed safely by the dog. If instead closure 200 is sheared or fractured by dog's bite at plane 170 (FIG. 3), portion 210 of closure 220 will be safely consumed. Portion 220 of closure 200, remaining lodged in hole 110 of toy 100, will be softened by dog's saliva (not shown) as it is licked causing the remaining portion 220 of closure 200 to disintegrate, enabling the dog to eventually reach food 130 in toy 100.

Frangible Closure—FIGS. 4A through 4E

FIGS. 4A through 4E show top, side, bottom, alternate side, and perspective views of a preferred embodiment of a further improved dog toy closure according to the invention. Closure 400 is a body of edible material having a truncated conical shape. Closure 400 preferably is baked of dog biscuit material. A cut-out relief portion 410 extends from the smaller end or bottom 404 of closure 400 to a point 420 near its larger end or top 402. This relief portion makes the closure frangible along preferred shear lines, as will be discussed.

The desired location of shear of the closure is plane 170, which coincides with the outer edge of hole 110 in toy 100 (FIG. 1), as shown in FIGS. 4B and 4D. When closure 400 is lodged at its proper depth or wedged in hole 110 (FIG. 1), plane 170 lies below the top end of cut-out relief 410. This is accomplished by proper dimensioning of closure 400 with relation to the diameter of hole 110.

OPERATION

Preferred Embodiment

FIGS. 4A through 4E, 5A, 5B, and 6A through 6C

Closure 400 is wedged into opening 110 of toy 100 (FIG. 1). In trying to access the contents of toy 100, the dog, in using its teeth and paws, may simply dislodge closure 400. However, if the dog shears or fractures it by the compression force of its bite, closure 400, being frangible, will break into two or three pieces as shown in FIGS. 5 and 6.

As shown in FIGS. 5A and 5B, closure 400 (FIG. 4) has broken into two pieces, 500 and 510. Piece 500 is too large to enter hole 110 (FIG. 1). It will fall away from toy 100 and therefore will not block access to food 130 inside toy 100. Since piece 510 is smaller than hole 110, it will fall away, enter the toy 100 through hole 110, or lodge in the hole. In the last case it is easily dislodged and will not block access to food 130 inside toy 100.

In FIG. 6, closure 400 (FIG. 4) has broken into three pieces, 600 (FIG. 6A), 610 (FIG. 6B), and 620 (FIG. 6C). Piece 600 is larger than hole 110 (FIG. 1). It will fall away from toy 100 and will not block access to food 130 inside toy 100. Pieces 610 and 620 are smaller than hole 110 and are therefore easily dislodged whether they fall inward or outward from hole 110, again allowing easy access to food 130 inside toy 100.

Thus an effective closure is provided which will remain in place until dislodged by the dog, and which will not block the entrance to toy 100, no matter now it is sheared or fractured.

DESCRIPTION

Additional Embodiment

FIGS. 7A through 7D

An alternative embodiment of the closure is shown in FIGS. 7A through 7D. FIGS. 7A through 7D are top, side, bottom, and perspective views of alternative closure embodiment 700. Top 710 of closure 700 is a right-circular cylindrical section, and sections 730 are slightly tapered, conic sections that wedge into hole 110 of toy 100 (FIG. 1). The diameter of top 710 is larger than the diameter of hole 110 (FIG. 1). An additional element is shown in this embodiment. Instead of only one, as described above, top 700 contains plural cut-out reliefs 720 which extend from the bottom 705 of closure 700 upward to a location 715 near top 710, above shear plane 170. Plural cut-out reliefs 720 result in plural sections 730 that contact the inside surface of hole 110 in toy 100 (FIG. 1). Closure 700 is preferably edible.

OPERATION

Additional Embodiment

FIGS. 7A through 7D and 8

The operation of closure 700 in FIG. 7 is similar to that of the preferred embodiment described above. The bottom sections 730 of closure 700 are wedged into opening 110 of toy 100 (FIG. 1). Top 710 remains outside toy 100 (FIG. 1) since it is larger in diameter than hole 110. Thus top 710 can not block hole 110. When a dog's bite shears closure 700 at plane 170, sections 730 will separate from top 710. Sections 730 are smaller than hole 110 (FIG. 1) and will not block hole 110 when separated from the remainder of closure 700.

Top 710 also provides a structure that is easily grasped by the dog's teeth, enabling the dog to chew on closure 700. Additionally, top 710 can be imprinted and embossed with a trademark or logo 800, as shown in FIG. 8.

Thus the alternative closure incorporates all the features and benefits of the preferred embodiment, yet has a different shape. Closure 700 securely seals toy 100 (FIG. 1) yet no matter how it is sheared or fractured, will not occlude opening 110 of toy 100.

CONCLUSIONS, RAMIFICATIONS, AND SCOPE

Accordingly the reader will see that, according to the invention, I have provided a superior closure for a hollow pet toy. The novel closure reliably seals the toy to prevent spillage of its contents, yet is readily removed by the pet, will not clog the opening of the toy when it is sheared or fractured, and is safely consumed.

While the above description contains many specificities, these should not be construed as limitations on the scope of the invention, but as exemplifications of the presently preferred embodiments thereof. Many other ramifications and variations are possible within the teachings of the invention. For example, the closure can contain medications that the animal must consume in order to reach the food treat inside the toy. Although the embodiments shown are circular in cross-section, they can instead be square, triangular, hexagonal, or randomly shaped. The toy can have one or more than two holes. It can be for non-canine pets, such as felines, monkeys, and the like. The toy can even be used by human animals (babies) learning to handle things. In lieu of a cut-out or relief portion, the closure can have weakened lines or frangible portions so that when stressed it will break into pieces that do not clog the entrance to the toy. Thus the scope of the invention should be determined by the appended claims and their legal equivalents, and not by the examples given.

What is claimed is:

1. A closure for a hollow container which contains food and which has at least one access opening to such food, where said opening has a predetermined size, comprising:

a body of material having first and second ends and first and second portions adjacent said first and second ends, respectively, said first portion having a cross-section sized to pass through said access opening, said second portion having a cross-section sized so that it will not pass through said access opening, said body of material having at least one slot extending into said body from said first end providing a means for causing said body to fracture into a plurality of pieces when subject to breaking stress, where each of said pieces is either larger or smaller than said access opening, so that when said closure is inserted in said opening and subject to said breaking stress, none of said pieces will remain lodged in said opening and block access to the inside of said container.

2. The closure of claim 1 wherein said closure is edible.

3. The closure of claim 1 wherein said closure has a conical shape.

4. The closure of claim 1 wherein said closure has a circular shape with two diameters.

5. The closure of claim 1 wherein said closure incorporates indicia.

6. The closure of claim 1 wherein said slot extends completely through said first portion into said second portion.

7. The closure of claim 1 wherein said closure has a plurality of slots extending into said body from said first end.

* * * * *